Patented Mar. 13, 1945

2,371,137

UNITED STATES PATENT OFFICE 2,371,137

LIGNIN SULPHONIC ACID COMPOUNDS IN STORAGE BATTERY PLATES

Joseph A. Orsino, Westfield, N. J., and Carlyle Harmon, Wausau, Wis.; said Orsino assignor to National Lead Company, New York, N. Y., a corporation of New Jersey, and said Harmon assignor to Marathon Corporation, a corporation of Wisconsin No Drawing. Application July 12, 1943, Serial No. 494,368

7 Claims. (Cl. 136—26)

The present invention relates to storage batteries of the lead-acid type and has particular reference to a new type of organic material which is incorporated into the oxide or paste used in making the negative plates of such storage batteries.

The principal object of this invention is to improve the storage battery by greatly increasing its capacity and life, particularly at high rates of discharge and at low temperatures.

One of the principal advantages of the lead-acid type of storage battery resides in the fact that such batteries have a small temperature-voltage coefficient, that is, lead-acid storage batteries have practically the same voltage at low temperatures, such as 0° F., as they have at higher or room temperatures such as 80° F. This voltage at low temperatures, while a little lower than that at room temperatures, is still of sufficient magnitude to operate a properly designed electrical motor starter at high speeds and still supply enough voltage to produce an intensity of spark sufficient to ignite the fuel. The power output of such batteries at low temperatures is, therefore, governed essentially by the length of time that this necessary starting voltage is maintained under a given amperage load.

It has long been known that the rate at which electrical energy is removed from a storage battery affects appreciably the amount of such energy which may be removed during any one discharge. Further, the temperature at which this electrical energy is removed also affects appreciably the amount of such energy that may be removed during any one discharge. In starting an internal combustion engine by means of an electrical motor operated by a storage battery of the lead-acid type, the amperage load is greatest at lower temperatures. Moreover, the power output of the battery is decreased at such temperatures. Thus, a battery rated at 100 ampere hours at a 20 hour rate, that is, one which is capable of delivering 5 amperes for 20 hours at 80° F. before the voltage drops to 1.75 volts per cell, will ordinarily deliver only 15 to 20 ampere hours when this battery is discharged at 300 amperes and at 0° F. to an output of 1 volt per cell. This represents an efficiency loss of from 80% to 85% as a result of higher rates of discharge and as a result of low temperatures.

Part of this efficiency is lost because of increased viscosity of the sulphuric acid electrolyte as a result of the low temperatures. The sulphuric acid in the electrolyte near the surface of the plates and in the interstices of the plates becomes partially depleted and converted to water. The high viscosity of the remaining electrolytic solution prevents sufficiently rapid diffusion of sulphuric acid atoms to replenish the converted sulphuric acid molecules within the plates. By far, however, the greatest loss in efficiency results from polarization of the negative plate of the storage battery at low temperatures and at high rates of discharge.

The principal object of this invention is to improve the performance of the battery by introducing a negative plate depolarizer into the oxide or paste used for making the negative plates of the battery. Another object of this invention is to incorporate a very active and relatively purified depolarizing compound of such a nature and in such small quantities that it is free from objectionable features such as sulphation of the negative plate surface and foaming of the sulphuric acid electrolyte.

Many organic materials have been used by the prior art whose behavior has been to improve the low temperature capacity of storage batteries of the lead-acid type. These materials have included wood flour, lignins, ligneous materials, humins, humic acids, waste organic material from sulphite and sulphate liquors, and the like. These materials have been known to the trade as organic expanders because of their supposed action of expanding or increasing the sponge-like nature of the negative active material. All such previous materials have been derived from the woody or fibrous material of plants, namely, from ligno-cellulose materials, and they have long been the subject of much controversy and confusion as to their exact chemical nature since their specific structures were not fully known. Some of the earlier materials were called expanders because some of these substances actually did cause the active material of the negative plates to become loosened and drop to the bottom of the cell thus shortening the life of the battery. All of these earlier materials consisted of a major portion of inert matter and a minor proportion of the active depolarizing compound. In order to achieve the desired depolarization, a large quantity of such substances had to be used and in many cases the presence of so much inert, woody, and fibrous material was responsible for the loosening and shedding of the active material of negative plates and the shortened life of the battery resulting therefrom. It was not uncommon in the prior art to use from 0.5% to 1.0% by weight of such substances in the negative plate.

In an earlier patent (Stewart No. 2,022,482), the by-product waste liquor resulting from the sulphite process for making paper pulp was partially purified and used to advantage in the preparation of negative storage battery plates. In the present invention, it has been found that other processing of waste liquors from the sulphite paper pulp process results in a decomposition and elimination of those organic and inorganic portions which are not active as depolarizers and, which in many cases produce deleterious foaming and sulphating characteristics of the electrolyte and negative plates respectively during the electrical formation of the battery.

According to the present invention, we have found that if selected acid-insoluble and alkali-dispersible lignin sulphonic acid compounds prepared in the manner described in co-pending patent application No. 494,403, filed July 12, 1943 are added to the negative oxide or negative paste used to prepare negative plates of storage batteries, the resultant batteries show vastly improved capacity and life characteristics. Such organic compounds are characterized as being acid-insoluble and alkali-dispersible lignin sulphonic acid compounds substantially free from calcium and manganese compounds and from non-ligneous organic and inorganic impurities. More particularly, it is to be pointed out that the lignin sulphonic acid compounds are produced by an alkaline hydrolysis, in an aqueous solution, as distinguished from thermal decomposition.

As disclosed in co-pending application Serial No. 494,403, filed July 12, 1943, the lignin sulphonic acid compounds we find advantageous to use are prepared from paper mill waste sulphite liquor. The lignin substances in the liquor are preferably precipitated with caustic lime to form basic calcium lignin sulphonate compounds. These lignin compounds are then dissolved in an aqueous solution of alkali, such as a solution of sodium hydroxide of predetermined concentration, preferably an amount equivalent to about one-half the weight of the lignin. The resulting alkaline aqueous solution is heated for a controlled period at a temperature above 100° C. and above atmospheric pressure, for example, at 160° C. for about 1.5 hours, or alternately at 175° C. for about 0.5 hour.

This hydrolysis renders about 35% to 50% by weight of the lignin compounds insoluble in sulphuric acid solution at about 3.5 pH, but the lignin compounds are still dispersible in aqueous alkaline solution. As a result of this treatment, a number of changes take place in the composition and properties of the lignin compounds including a material reduction in the organically combined sulphur content, for example, a reduction to about ½ to about ⅓ by weight of that originally present in the calcium lignin sulphonate compounds used as a starting material. The resulting lignin product is not a single homogeneous lignin sulphonate compound, but consists of compounds having high and low sulphur content within the limits determined by the specific conditions of the treatment.

The alkaline heat treatment of the process alters the lignin sulphonic acid compounds by reducing the content of organically combined sulphur and altering the compounds in other ways, such as in the nature of polymerization, condensation, rearrangement or cleavage reactions. These alterations are a function of the temperature, pressure, time and other conditions during the heat treatment and hence are controllable to some extent within the permissible limits of yielding lignin sulphonic acid compounds that are acid-insoluble and dispersible under aqueous alkaline conditions. The conditions of this treatment must therefore be controlled carefully so as to yield a final product satisfactory for storage battery use as determined by optimum performance in storage batteries.

The solid content of the resulting solution obtained as previously described is then adjusted to between 20 and 28% by weight total solids. Such solution is then treated at a temperature around 65° C. with carbon dioxide gas while the pH is reduced within a range between 10.7 and 11.0 to precipitate calcium carbonate in filterable form and practically free of organic matter. The calcium carbonate is filtered out and sulphuric acid is added to the filtrate in sufficient amount to establish a pH of between 3 and 4 while maintaining the temperature at about 80 to 90° C. and to precipitate sodium lignin sulphonate compounds and preferably heating to about 95 to 98° C. to coagulate the resultant precipitate. The solution is cooled after coagulation, filtered, and the precipitated product washed with pure water until substantially all soluble impurities are removed. The washed precipitate is dried to yield the desired sodium lignin sulphonate product. This product is suitable for use in preparing the paste for storage battery negative plates. The sodium lignin sulphonate compounds may be converted to the free acid compounds by treating with dilute sulphuric acid such as about 5% concentration. Other corresponding metallic salts may be formed by usual base exchange reactions with the free lignin sulphonic acid or sodium compounds. For example, the corresponding barium lignin sulphonate compounds, which are suitable for use in storage battery plates, may be prepared by treating the sodium lignin sulphonate compounds with barium chloride or other soluble barium salt.

We have found that, although larger amounts of this type of substance may be used, the amount of such acid-insoluble and alkali-dispersible lignin sulphonic acid compounds needed to produce the beneficial effects of the present invention is relatively small, that is, of the order of 0.1% to 0.2% of the weight of the lead compound used in the negative plates of the battery. As a result of the purity of the active material, particularly the absence of manganese compounds, and the smaller quantity required, the organic depolarizing material does not produce objectionable foaming of the electrolyte during electrical formation of the battery, nor does it result in sulphation characteristics of the negative plates during such electrical formation.

Thus, it has been observed that if the negative plates of 100 ampere hour storage batteries are made with an oxide containing 0.1% of the active material hereinabove described, together with the usual blanc fixe and lampblack additions, the resultant battery delivers 3.72 minutes initially at 300 amperes and at 0° F.; and following 300 cycles on SAE life test the battery still delivers 3.85 minutes at the same rate and at the same temperature. When 0.2% of this material is used in the oxide, a similar resultant battery delivers 4.07 minutes initially and 4.75 minutes after 300 cycles on SAE life test.

Based on the amount of active material employed, this performance is superior to the results attained through the use of prior art organic materials. Thus we have found when 0.2% of the active material of the present invention was employed in the negative plates of a storage battery, the battery displayed greater life capacity than a battery similarly assembled and containing in the negative plates as much as 0.5% of prior art active material.

In order that the present invention may be more particularly understood, the following example is presented:

To 100 pounds of lead oxide to which had been previously added 0.2 pound blanc fixe and 0.1 pound of lampblack, was added 0.1 pound of the acid-insoluble and alkali-dispersible sodium lignin sulphonate compounds of the character above described. The mixture was well stirred to disperse the organic and inorganic ingredients throughout the entire mass. Then 5,000 c. c. of water were added and the mixing continued until the mix was well blended and was of a pasty consistency. To this was added 3,500 c. c. of sulphuric acid of a specific gravity of about 1.250 and mixing was continued until the reaction between the acid and the lead oxide was complete. The material was then pasted into grids which were used as negative plates in making up storage batteries in the usual manner.

The foregoing description and example of our present invention have been given for illustrative purposes and no undue limitations should be deduced therefrom. Accordingly, it is to be understood that variations and modifications capable of being accomplished by the mere exercise of skill of the art are to be embraced within the scope of the appended claims.

Having thus described our invention, we claim the following as new and useful:

1. Active material for negative lead storage battery plates comprising lead oxide in admixture with a small amount of acid-insoluble and alkali-dispersible partially desulphonated lignin sulphonic acid compounds substantially free from calcium and manganese compounds and from non-ligneous organic and inorganic impurities, said compounds being produced by hydrolyzing calcium lignin sulphonate compounds in an aqueous alkali solution, treating the resulting solution with carbon dioxide to precipitate calcium carbonate, filtering out the calcium carbonate, precipitating the lignin sulphonate compounds in solution by means of an inorganic acid and filtering the compounds.

2. Active material for negative lead storage battery plates comprising lead oxide in admixture with a small amount of acid-insoluble and alkali-dispersible partially desulphonated sodium lignin sulphonate compounds substantially free from calcium and manganese compounds and from non-ligneous organic and inorganic impurities, said compounds being produced by hydrolyzing calcium lignin sulphonate compounds in an aqueous alkali solution, treating the resulting solution with carbon dioxide to precipitate calcium carbonate, filtering out the calcium carbonate, precipitating the lignin sulphonate compounds in solution by means of an inorganic acid and filtering the compounds.

3. Active material for negative lead storage battery plates comprising lead oxide in admixture with a small amount of acid-insoluble and alkali-dispersible partially desulphonated barium lignin sulphonate compounds substanitally free from calcium and manganese compounds and from non-ligneous organic and inorganic impurities, said compounds being produced by hydrolyzing calcium lignin sulphonate compounds in an aqueous alkali solution, treating the resulting solution with carbon dioxide to precipitate calcium carbonate, filtering out the calcium carbonate, precipitating the lignin sulphonate compounds in solution by means of an inorganic acid and filtering the compounds.

4. Active material for negative lead storage battery plates comprising lead oxide in admixture with between about 0.1% and about 0.2% by weight of acid-insoluble and alkali-dispersible lignin sulphonic acid compounds substantially free from calcium and manganese compounds and from non-ligneous organic and inorganic impurities, said compounds being partially desulphonated lignin sulphonic acid compounds produced by hydrolyzing calcium lignin sulphonate compounds in an aqueous alkali solution, treating the resulting solution with carbon dioxide to precipitate calcium carbonate, filtering out the calcium carbonate, precipitating the lignin sulphonate compounds in solution by means of an inorganic acid and filtering the compounds.

5. Active material for negative lead storage battery plates comprising lead oxide and small amounts of blanc fixe and lampblack in admixture with between about 0.1% and 0.2% by weight of acid-insoluble and alkali-dispersible lignin sulphonic acid compounds substantially free from calcium and manganese compounds and from non-ligneous organic and inorganic impurities, produced by hydrolyzing calcium lignin sulphonate compounds in an aqueous alkali solution, treating the resulting solution with carbon dioxide to precipitate calcium carbonate, filtering out the calcium carbonate, precipitating the lignin sulphonate compounds in solution by means of an inorganic acid and filtering the compounds.

6. A lead storage negative battery plate having incorporated in its active material a small portion of acid-insoluble and alkali-dispersible partially desulphonated lignin sulphonic acid compounds substantially free from calcium and manganese compounds and from non-ligneous organic and inorganic impurities, said compounds being produced by hydrolyzing calcium lignin sulphonate compounds in an aqueous alkali solution, treating the resulting solution with carbon dioxide to precipitate calcium carbonate, filtering out the calcium carbonate, precipitating the lignin sulphonate compounds in solution by means of an inorganic acid and filtering the compounds.

7. A lead storage negative battery plate having active material comprising lead oxide in admixture with between about 0.1% and about 0.2% by weight of acid-insoluble and alkali-dispersible lignin sulphonic acid compounds substantially free from calcium and manganese compounds and from non-ligneous organic and inorganic impurities, said compounds being partially desulphonated lignin sulphonic acid compounds produced by hydrolyzing calcium lignin sulphonate compounds in an aqueous alkali solution, treating the resulting solution with carbon dioxide to precipitate calcium carbonate, filtering out the calcium carbonate, precipitating the lignin sulphonate compounds in solution by means of an inorganic acid and filtering the compounds.

JOSEPH A. ORSINO.
CARLYLE HARMON.